(12) United States Patent
Boul et al.

(10) Patent No.: US 11,370,952 B2
(45) Date of Patent: Jun. 28, 2022

(54) MAGNETICALLY RESPONSIVE DRILLING FLUID AND METHODS OF MAKING AND USE THEREOF

(71) Applicant: Saudi Arabian Oil Company, Dhahran (SA)

(72) Inventors: Peter J. Boul, Houston, TX (US); Ashok Santra, The Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 142 days.

(21) Appl. No.: 17/065,001

(22) Filed: Oct. 7, 2020

(65) Prior Publication Data

US 2021/0115314 A1   Apr. 22, 2021

Related U.S. Application Data

(60) Provisional application No. 62/923,146, filed on Oct. 18, 2019.

(51) Int. Cl.
| | | |
|---|---|---|
| *E21B 21/00* | (2006.01) | |
| *E21B 21/08* | (2006.01) | |
| *C09K 8/03* | (2006.01) | |
| *E21B 47/00* | (2012.01) | |

(52) U.S. Cl.
CPC .............. *C09K 8/032* (2013.01); *E21B 21/00* (2013.01); *E21B 21/08* (2013.01); *E21B 47/00* (2013.01); *C09K 2208/10* (2013.01)

(58) Field of Classification Search
CPC ...... E21B 21/00; E21B 21/08; C09K 2208/10
See application file for complete search history.

(56) References Cited

U.S. PATENT DOCUMENTS

| | | | |
|---|---|---|---|
| 8,609,189 B2 | 12/2013 | Salah | |
| 8,993,346 B2 | 3/2015 | Radtkey et al. | |
| 9,879,170 B2 * | 1/2018 | Boul | ...................... C04B 28/02 |
| 2013/0112911 A1 | 5/2013 | Mazyar et al. | |
| 2014/0224480 A1 | 8/2014 | Nguyen et al. | |
| 2016/0010424 A1 | 1/2016 | van Oort et al. | |

(Continued)

OTHER PUBLICATIONS

Choi et al., "Multimodal Biomedical Imaging wtih Asymmetric Single-Walled Carbon Nanotube/Iron Oxide Nanoparticle Complexes", Nano Lett. vol. 7, No. 4, pp. 861-867, Apr. 2007.

(Continued)

*Primary Examiner* — Catherine Loikith
(74) *Attorney, Agent, or Firm* — Dinsmore & Shohl LLP

(57) ABSTRACT

Magnetically responsive drilling fluids and methods of using magnetically responsive drilling fluids. The magnetically responsive drilling fluids may include a drilling fluid and a plurality of superparamagnetic nanostructures disposed within the drilling fluid. The plurality of superparamagnetic nanostructures may include superparamagnetic-iron-oxide-nanoparticles (SPIONs) and carbon nanotubes (CNTs) adsorbed onto the SPIONs. The method of using the magnetically responsive drilling fluid may include introducing the magnetically responsive drilling fluid into a subsurface formation and applying a magnetic field to the magnetically responsive drilling fluid to elicit a rheological change in the magnetically responsive drilling fluid.

20 Claims, 1 Drawing Sheet

(56) References Cited

U.S. PATENT DOCUMENTS

2017/0015895 A1* 1/2017 Cox .................... C09K 8/72
2017/0015896 A1* 1/2017 Cox .................... C09K 8/588

OTHER PUBLICATIONS

Lee et al., "Synthesis of a hybrid material consisting of magnetic iron-oxide nanoparticles and carbon nanotubes as a gas adsorbent", Carbon, vol. 48, pp. 1397-1404, 2010.
Li et al., "Growth of Single-Walled Carbon Nanotubes from Discrete Catalytic Nanoparticles of Various Sizes", J. Phys. Chem. B, vol. 105, pp. 11424-11431, 2001.
Teja et al., "Synthesis, properties, and applications of magnetic iron oxide nanparticles", Progress in Crystal Growth and Characterization of Materials, vol. 55, pp. 22-45, 2009.
International Search Report and Written Opinion dated Feb. 4, 2021 pertaining to International application No. PCT/US2020/055990 filed Oct. 16, 2020, 16 pgs.
Vipulanandan, C. et al., OTC-27626-MS "Smart Bentonite Drilling Muds Modified with Iron Oxide Nanoparticles and Characterized Based on the Electrical Resistivity and Rheological Properties with Varying Magnetic Field Strengths and Temperatures", Jan. 1, 2017, pp. 1-18.
Vryzas, Z. et al., SPE-183906-MS "Smart Magnetic Drilling Fluid With In-Situ Rheological Controllability Using Fe3O4 Nanoparticles", Jan. 1, 2017, pp. 1-12.
Kang J. H. et al., "Magnetophoretic Continuous Purification of Single-Walled Carbon Nanotubes from Catalytic Impurities in a Microfluidic Device", SMALL, vol. 3, No. 10, Oct. 1, 2007, pp. 1784-1791.

* cited by examiner

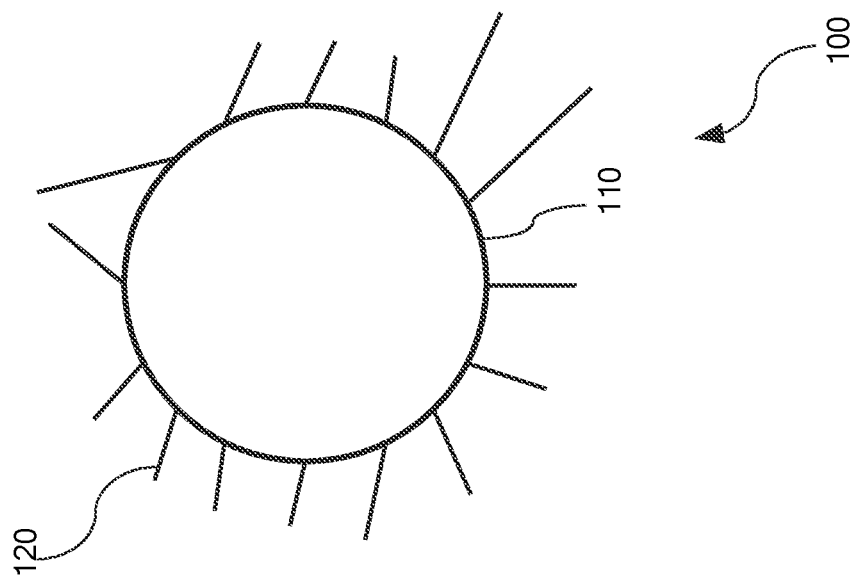

MAGNETICALLY RESPONSIVE DRILLING FLUID AND METHODS OF MAKING AND USE THEREOF

CROSS REFERENCE TO RELATED APPLICATIONS

This application claims the benefit of U.S. Provisional Application Ser. No. 62/923,146 filed Oct. 18, 2018, the entire disclosure of which is hereby incorporated herein by reference.

TECHNICAL FIELD

Embodiments of the disclosure generally relate to magnetically responsive drilling fluids and methods of making and using magnetically responsive drilling fluids.

BACKGROUND

Drilling fluids in the oil and gas industries perform a myriad of tasks, including cleaning a well, holding cuttings in suspension, reducing friction, lubricating the drilling tools, maintaining stability of a wellbore, and preventing fluid loss, to name a few. However, the ability of conventional drilling fluids to effectively suspend proppant and perform zonal isolation decreases as the temperature of the drilling fluid increases due to thermal thinning of the drilling fluid. To overcome these difficulties, drilling fluids with dynamically tunable rheological properties may be used. Magnetically responsive drilling fluids will enable more controllable shear response and viscosity, complete removal of drilling fluids from the wellbore after drilling, aid in zonal isolation, and provide an improved margin of error for operators.

SUMMARY

Accordingly, an ongoing need exists for drilling fluids with dynamically tunable rheological properties. The present embodiments address these needs by providing magnetically responsive drilling fluids having tunable rheological properties and methods of making and using magnetically responsive drilling fluids.

In one embodiment, the present disclosure relates to a magnetically responsive drilling fluid including a drilling fluid and a plurality of superparamagnetic nanostructures disposed within the drilling fluid. The superparamagnetic nanostructures include superparamagnetic-iron-oxide-nanoparticles (SPIONs) and carbon nanotubes adsorbed onto the SPIONs.

In additional embodiments, the present disclosure relates to methods of using the previously disclosed magnetically responsive drilling fluid. The method includes introducing the magnetically responsive drilling fluid into a subsurface formation and applying a magnetic field to the magnetically responsive drilling fluid to elicit a rheological change in the magnetically responsive drilling fluid.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWING

The following detailed description of specific embodiments of the present disclosure can be best understood when read in conjunction with the following drawing, where like structure is indicated with like reference numerals and in which:

FIG. 1 is a schematic illustration of a superparamagnetic-iron-oxide nanoparticle, according to one or more embodiments described in this disclosure.

DETAILED DESCRIPTION

As used throughout this disclosure, the term "drilling fluid" refers to liquid and gaseous fluids and mixtures of fluids and solids (as solid suspensions, mixtures and emulsions of liquids, gases and solids) used in operations to drill wellbores.

As used throughout this disclosure, the term "subsurface formation" refers to a body of rock that is sufficiently distinctive and continuous from the surrounding rock bodies that the body of rock may be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "reservoir" refers to a subsurface formation having sufficient porosity and permeability to store and transmit fluids.

As used throughout this disclosure, the term "wellbore" refers to the drilled hole or borehole, including the openhole or uncased portion of the well. Borehole may refer to the inside diameter of the wellbore wall, the rock face that bounds the drilled hole.

As used throughout the disclosure, the term "aqueous phase" refers to a fluid containing, producing, resembling, or having the properties of water. Similarly, "oleaginous phase" refers to a fluid containing, producing, resembling, or having the properties of oil.

As used throughout this disclosure, the term "Newtonian viscosity" refers to the apparent viscosity of a fluid measured at a given rotor speed of a rotational viscometer. The Newtonian viscosity may be measured by multiplying the dial reading of the viscometer by 300, and dividing that product by the rotor speed in revolutions per minute (RPM).

Referring now to FIG. 1, embodiments of the present disclosure are directed to magnetically responsive drilling fluids and methods of using magnetically responsive drilling fluids. The embodiments include, among other things, a drilling fluid and a plurality of superparamagnetic nanostructures 100 disposed within the drilling fluid. The superparamagnetic nanostructures 100 may include superparamagnetic-iron-oxide-nanoparticles 110 (SPIONs) and carbon nanotubes 120 adsorbed onto the SPIONs 110. The SPIONs 110 may include iron oxide nanoparticles of between 1 and 1000 nanometers (nm) in average diameter. For example, the SPIONs 110 may include iron oxide nanoparticles 110 of between 1 nm and 10 nm, 10 nm and 20 nm, 20 nm and 30 nm, 30 nm and 40 nm, 40 nm and 50 nm, 50 nm and 60 nm, 60 nm and 70 nm, 70 nm and 80 nm, 80 nm and 90 nm, 90 nm and 100 nm, 100 nm and 150 nm, 150 nm and 200 nm, 200 nm and 250 nm, 250 nm and 300 nm, 300 nm and 350 nm, 350 nm and 400 nm, 400 nm and 450 nm, 450 nm and 500 nm, 500 nm and 550 nm, 550 nm and 600 nm, 650 nm and 700 nm, 750 nm and 800 nm, 800 nm and 850 nm, 850 nm and 900 nm, 900 nm and 950 nm, 950 nm and 1000 nm, or any combination of these.

Conventional drilling fluids that utilize solid weighting agents, such as barite, encounter difficulties as the solids separate from the liquid and settle in the wellbore, known as barite sag. Barite sag typically occurs when flow of drilling fluid through the wellbore is stopped for a period of time during which the drilling fluid is static, but barite sag may also occur at decreased flow or annular velocity of the drilling fluid. Barite sag may also be worsened by reduced viscosity or reduced gel strength drilling fluids, reduced shear rate conditions, and downhole temperatures. Settling of the solid weighting material may cause variations in the density of drilling fluid throughout the wellbore. For example, the drilling fluid in the bottom of the wellbore may have a greater density due to settling of the solids towards the bottom of the wellbore caused by gravity, and the drilling fluid near the surface may have a lesser density. Barite sag conditions may lead to stuck pipe conditions, reductions in the hole-cleaning ability of the drilling fluid, or both. The hole-cleaning ability of a drilling fluid refers to the ability of the drilling fluid to capture rock cuttings from the drilling zone and convey them to the surface of the wellbore.

As a non-limiting example, the magnetically responsive drilling fluids of the present disclosure may be used in the oil and gas drilling industries, such as for drilling in oil and gas wells. Oil and gas wells may be formed in subsurface portions of the Earth, sometimes referred to as subsurface geological formations. The wellbore may serve to connect natural resources, such as petrochemical products, to a ground level surface. In some embodiments, a wellbore may be formed in the geological formation, such as by a drilling procedure. To drill a subsurface well or wellbore, a drill string including a drill bit and drill collars to weight the drill bit is inserted into a predrilled hole and rotated to cut into the rock at the bottom of the hole, producing rock cuttings. The magnetically responsive drilling fluid, known as "drilling mud," may be utilized during the drilling process. To remove the rock cuttings from the bottom of the wellbore, drilling fluid is pumped down through the drill string to the drill bit. The magnetically responsive drilling fluid may cool the drill bit and lift the rock cuttings away from the drill bit and may carry the rock cuttings upwards as the magnetically responsive drilling fluid is recirculated back to the surface. The magnetically responsive drilling fluid serves several functions in the drilling process. The magnetically responsive drilling fluid may provide lubrication and may cool the drill bit. The magnetically responsive drilling fluid may also transport rock cuttings from the drill bit to the surface, which may be referred to as "cleaning" the wellbore. Additionally, the magnetically responsive drilling fluid may provide hydrostatic pressure in the wellbore to provide support to the sidewalls of the wellbore and prevent the sidewalls from collapsing and caving in on the drill string. The magnetically responsive drilling fluid may also prevent fluids in the downhole formations from flowing into the wellbore during drilling operations.

To accomplish these functions, the magnetically responsive drilling fluid may be formulated to have specific characteristics, such as density, viscosity, solids content, pumpability and hole-cleaning capability, among others. In particular, the magnetically responsive drilling fluid may be formulated to have a density in a range suitable to provide the necessary hydrostatic pressure to support the sidewalls of the wellbore and prevent fluids in the formation from flowing into the wellbore. Additionally, the magnetically responsive drilling fluids may be formulated to have specific rheological properties that allow the magnetically responsive drilling fluid to be pumped down through the drill string while still capturing and conveying rock cuttings from the drill bit to the top of the wellbore. In some embodiments, the magnetically responsive drilling fluids may include solid particles suspended in a base fluid. The solid particles, sometimes referred to as a weighting agent, may increase the density of the magnetically responsive drilling fluid to help the magnetically responsive drilling fluid support the sidewalls of the wellbore as well as increase the hydrostatic pressure to keep fluids from the formation from flowing into the wellbore. In other embodiments, the magnetically responsive drilling fluids may be able to provide the necessary hydrostatic pressure without the use of solid particles to increase the density of the fluid.

Referring again to FIG. 1, the superparamagnetic nanostructures 100 may include nanoparticles 110 of a ferromagnetic material or oxide of a ferromagnetic material, such as copper, iron, nickel, cobalt, manganese, magnesium, bismuth, tin, yttrium, chromium, gadolinium, terbium, dysprosium, europium, or any combination of these. The superparamagnetic nanostructures 100 may include nanoparticles 110 of between 1 nm and 10 nm, 10 nm and 20 nm, 20 nm and 30 nm, 30 nm and 40 nm, 40 nm and 50 nm, 50 nm and 60 nm, 60 nm and 70 nm, 70 nm and 80 nm, 80 nm and 90 nm, 90 nm and 100 nm, 100 nm and 150 nm, 150 nm and 200 nm, 200 nm and 250 nm, 250 nm and 300 nm, 300 nm and 350 nm, 350 nm and 400 nm, 400 nm and 450 nm, 450 nm and 500 nm, 500 nm and 550 nm, 550 nm and 600 nm, 650 nm and 700 nm, 750 nm and 800 nm, 800 nm and 850 nm, 850 nm and 900 nm, 900 nm and 950 nm, 950 nm and 1000 nm, or any combination of these.

The individual superparamagnetic nanostructures 100 may have an average outer diameter of between 10 nm and 150,000 nm. For example, the superparamagnetic nanostructures 100 may have an average outer diameter of between 10 nm and 50 nm, 50 nm and 100 nm, 100 nm and 150 nm, 150 nm and 200 nm, 200 nm and 300 nm, 300 nm and 400 nm, 400 nm and 500 nm, 500 nm and 600 nm, 600 nm and 700 nm, 700 nm and 800 nm, 800 nm and 900 nm, 900 nm and 1000 nm, 1200 nm and 1400 nm, 1400 nm and 1600 nm, 1600 nm and 1800 nm, 1800 nm and 2000 nm, 2000 nm and 2500 nm, 2500 nm and 3000 nm, 3000 nm and 3500 nm, 3500 nm and 4000 nm, 4000 nm and 4500 nm, 4500 nm and 5000 nm, 5000 nm and 5500 nm, 5500 nm and 6000 nm, 6500 nm and 7000 nm, 7000 nm and 7500 nm, 7500 nm and 8000 nm, 8000 nm and 9000 nm, 9000 nm and 10000 nm, 10000 nm and 12000 nm, 12000 nm and 14000 nm, 14000 nm and 16000 nm, 16000 nm and 18000 nm, 18000 nm and 20000 nm, 20000 nm and 25000 nm, 25000 nm and 30000 nm, 30000 nm and 40000 nm, 40000 nm and 50000 nm, 50000 nm and 60000 nm, 60000 nm and 70000 nm, 70000 nm and 80000 nm, 80000 nm and 90000 nm, 90000 nm and 100000 nm, 100000 nm and 110000 nm, 110000 nm and 120000 nm, 120000 nm and 130000 nm, 130000 nm and 140000 nm, 140000 nm and 150000 nm, or any combination of these. It should be understood that the average outer diameter of the superparamagnetic nanostructures 100 includes the CNTs 120 adsorbed onto the SPIONs 110. Without being limited by theory, it is believed that SPIONs 110 alone may not be capable of inducing a magnetic response in the magnetically responsive drilling fluid due to their small size. Traditionally, larger particles than SPIONs 110 are used for inducing a magnetorheological effect; due to the SPIONS's small size and minimal interaction with the solvent. It is believed that the increased interaction between the superparamagnetic nanostructures 100 and the solvent, relative to the SPIONs 110 alone, may result in greater rheological changes upon the application of a magnetic field.

Embodiments of the present disclosure are directed to magnetically responsive drilling fluids in which the CNTs further include silicon carbide nanotubes (SiCNTs) and the superparamagnetic nanostructures have an average silicon to iron mass ratio of from 1:1 to 1:2, 1:2 to 1:3, 1:3 to 1:4, 1:4 to 1:5, 1:5 to 1:6, 1:6 to 1:7, 1:7 to 1:8, 1:9 to 1:10, 1:10 to 1:12, 1:12 to 1:14, 1:14 to 1:16, 1:16 to 1:18, 1:18 to 1:20, 1:20 to 1:25, 1:25 to 1:30, 1:30 to 1:35, 1:35 to 1:40, 1:40 to 1:45, 1:45 to 1:50, 1:50 to 1:60, 1:60 to 1:70, 1:70 to 1:80, 1:80 to 1:90, 1:90 to 1:100, 1:100 to 1:125, 1:125 to 1:150, 1:150 to 1:150, 1:175 to 1:200, 1:200 to 1:250, 1:250, 1:250 to 1:300, 1:300 to 1:400, 1:400 to 1:500, 1:500 to 1:600, 1:600 to 1:700, 1:700 to 1:800, 1:800 to 1:900, 1:900 to 1:1000, 1:1000 to 1:1250, 1:1250 to 1:1500, 1:1500 to 1:2000, 1:2000 to 1:3000, 1:3000 to 1:4000, 1:4000 to 1:5000, 1:5000 to 1:10000, 1:10000 to 1:20000, 1:20000 to 1:40000, 1:400000 to 1:60000, or any combination of these. SiCNT may refer to one of nanotubes constructed of silicon carbide, carbon nanotubes coated with silicon, carbon nanotubes coated with silicon carbide, or a combination of these. SiCNT may provide additional thermal stability and mechanical strength.

According to some embodiments, the magnetically responsive drilling fluid includes from 0.001 to 10.0 weight percent (wt. %) superparamagnetic nanostructures as calculated by a total weight of the magnetically responsive drilling fluid. For example, the magnetically responsive drilling fluid may include from 0.001 wt. % to 0.005 wt. %, 0.005 wt. % to 0.001 wt. %, 0.001 wt. % to 0.0015 wt. %, 0.0015 wt. % to 0.002 wt. %, 0.002 wt. % to 0.0025 wt. %, 0.0025 wt. % to 0.003 wt. %, 0.003 wt. % to 0.0035 wt. %, 0.0035 wt. % to 0.004 wt. %, 0.004 wt. % to 0.0045 wt. %, 0.0045 wt. % to 0.0050 wt. %, 0.0050 wt. % to 0.006 wt. %, 0.006 wt. % to 0.007 wt. %, 0.007 wt. % to 0.008 wt. %, 0.008 wt. % to 0.009 wt. %, 0.009 wt. % to 0.01 wt. %, 0.01 wt. % to 0.02 wt. %, 0.02 wt. % to 0.03 wt. %, 0.03 wt. % to 4 wt. %, 0.04 wt. % to 0.05 wt. %, 0.05 wt. % to 0.06 wt. %, 0.06 wt. % to 0.07 wt. %, 0.07 wt. % to 0.08 wt. %, 0.08 wt. % to 0.09 wt. %, 0.09 wt. % to 0.1 wt. %, 0.1 wt. % to 0.2 wt. %, 0.2 wt. % to 0.3 wt. %, 0.3 wt. % to 0.4 wt. %, 0.4 wt. % to 0.5 wt. %, 0.5 wt. % to 0.6 wt. %, 0.6 wt. % to 0.7 wt. %, 0.7 wt. % to 0.8 wt. %, 0.8 wt. % to 0.9 wt. %, 0.9 wt. % to 1.0 wt. %, 1.0 wt. % to 2.0 wt. %, 2.0 wt. % to 3.0 wt. %, 3.0 wt. % to 4.0 wt. %, 4.0 wt. % to 5.0 wt. %, 5.0 wt. % to 6.0 wt. %, 6.0 wt. % to 7.0 wt. %, 7.0 wt. % to 8.0 wt. %, 8.0 wt. % to 9.0 wt. %, 9.0 wt. % to 10.0 wt. %, or even greater than 10 wt. %, or any combination of these, of the superparamagnetic nanostructures as calculated by a total weight of the magnetically responsive drilling fluid.

Fluid rheology is an important parameter of drilling fluid performance. For critical offshore applications with extreme temperature and pressure requirements, the viscosity profile of the fluid often is measured with a controlled temperature and pressure viscometer (for instance, an iX77 Rheometer, commercially available from Fann Instruments (Houston, Tex.)). Fluids may be tested at temperatures of from 35° F. to 500° F., with pressures of up to 20,000 pounds per square inch (psi). Temperatures greater than 100° F. and pressures greater than 100 psi may be encountered in subsurface formations, changing the viscosity profile of the fluid. The rheological behavior of the drilling fluid, such as gel strength, plastic viscosity, and yield point, may be determined from measurements of the viscosity, shear stress, and shear rate.

The gel strength of a magnetically responsive drilling fluid refers to the shear stress of the magnetically responsive drilling fluid measured at a shear rate of less than 10 RPM following a defined period of time during which the magnetically responsive drilling fluid is maintained in a static state. The gel strength may be an indication of how well the drilling fluid would be able to suspend cuttings once the pump is shut down, as well as an indication of barite sag. The magnetically responsive drilling fluids of the present disclosure may have a gel strength after 10 seconds of from 0.1 pounds of force per one hundred square feet ($lb_f/100\ ft^2$) to 50 $lb_f/100\ ft^2$. For example, the gel strength after 10 seconds may be from 0.1 $lb_f/100\ ft^2$ to 50 $lb_f/100\ ft^2$, or from 0.5 $lb_f/100\ ft^2$ to 50 $lb_f/100\ ft^2$, or from 1 $lb_f/100\ ft^2$ to 50 $lb_f/100\ ft^2$, or from 5 $lb_f/100\ ft^2$ to 50 $lb_f/100\ ft^2$, or from 10 $lb_f/100\ ft^2$ to 50 $lb_f/100\ ft^2$, or from 20 $lb_f/100\ ft^2$ to 50 $lb_f/100\ ft^2$, or from 30 $lb_f/100\ ft^2$ to 50 $lb_f/100\ ft^2$, or from 0.1 $lb_f/100\ ft^2$ to 40 $lb_f/100\ ft^2$, or from 0.1 $lb_f/100\ ft^2$ to 30 $lb_f/100\ ft^2$, or from 0.1 $lb_f/100\ ft^2$ to 20 $lb_f/100\ ft^2$, or from 1 $lb_f/100\ ft^2$ to 50 $lb_f/100\ ft^2$, or from 1 $lb_f/100\ ft^2$ to 40 $lb_f/100\ ft^2$, or from 1 $lb_f/100\ ft^2$ to 30 $lb_f/100\ ft^2$, or from 5 $lb_f/100\ ft^2$ to 50 $lb_f/100\ ft^2$, or from 5 $lb_f/100\ ft^2$ to 40 $lb_f/100\ ft^2$, or from 5 $lb_f/100\ ft^2$ to 30 $lb_f/100\ ft^2$, or from 10 $lb_f/100\ ft^2$ to 50 $lb_f/100\ ft^2$, or from 10 $lb_f/100\ ft^2$ to 50 $lb_f/100\ ft^2$, or from 20 $lb_f/100\ ft^2$ to 50 $lb_f/100\ ft^2$, or from 20 $lb_f/100\ ft^2$ to 40 $lb_f/100\ ft^2$, or from 20 $lb_f/100\ ft^2$ to 30 $lb_f/100\ ft^2$, or any combination of these.

According to some embodiments, the gel strength after ten seconds of the magnetically responsive drilling fluid in a $\beta$ Tesla magnetic field is at least 10% greater than the gel strength of the magnetically responsive drilling fluid in a magnetic field of less than 0.0000001 Tesla (T). For example, the gel strength after ten seconds may increase by at least 10%, 15%, 20%, 25%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000%, 1500%, 2000%, 2500%, 3000%, 3500%, 4000%, 4500%, 5000%, or 10,000%. $\beta$ may be from 0.001 to 0.005 T, 0.005 to 0.01 T, 0.01 to 0.02 T, 0.02 to 0.03 T, 0.03 to 0.04 T, 0.04 to 0.05 T, 0.05 to 0.075 T, 0.075 to 0.1 T, 0.1 to 0.15 T, 0.15 to 0.2 T, 0.2 to 0.3 T, 0.3 to 0.4 T, 0.4 to 0.5 T, 0.5 to 0.6 T, 0.6 to 0.7 T, 0.7 to 0.8 T, 0.8 to 0.9 T, 0.9 to 1.0 T, 1.0 to 1.5 T, 1.5 to 2.0 T, 2.0 to 2.5 T, 2.5 to 3.0 T, 3.0 to 3.5 T, 3.5 to 4.0 T, 4.0 to 4.5 T, 4.5 to 5.0 T, 5.0 to 5.5 T, 5.5 to 6.0 T, 6.0 to 7.0 T, 7.0 to 8.0 T, 8.0 to 9.0 T, or 9.0 to 10.0 T. In some embodiments, $\beta$ may be greater than 10 T.

According to some embodiments, the gel strength after ten minutes of the magnetically responsive drilling fluid in a $\beta$ Tesla magnetic field is at least 10% greater than the gel strength of the magnetically responsive drilling fluid in a magnetic field of less than 0.0000001 Tesla. For example the gel strength after ten minutes may increase by at least 10%, 15%, 20%, 25%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000%, 1500%, 2000%, 2500%, 3000%, 3500%, 4000%, 4500%, 5000%, or 10,000%. $\beta$ may be from 0.001 to 0.005 T, 0.005 to 0.01 T, 0.01 to 0.02 T, 0.02 to 0.03 T, 0.03 to 0.04 T, 0.04 to 0.05 T, 0.05 to 0.075 T, 0.075 to 0.1 T, 0.1 to 0.15 T, 0.15 to 0.2 T, 0.2 to 0.3 T, 0.3 to 0.4 T, 0.4 to 0.5 T, 0.5 to 0.6 T, 0.6 to 0.7 T, 0.7 to 0.8 T, 0.8 to 0.9 T, 0.9 to 1.0 T, 1.0 to 1.5 T, 1.5 to 2.0 T, 2.0 to 2.5 T, 2.5 to 3.0 T, 3.0 to 3.5 T, 3.5 to 4.0 T, 4.0 to 4.5 T, 4.5 to 5.0 T, 5.0 to 5.5 T, 5.5 to 6.0 T, 6.0 to 7.0 T, 7.0 to 8.0 T, 8.0 to 9.0 T, 9.0 to 10.0 T, or any combination of these. In some embodiments, $\beta$ may be greater than 10 T.

The rheological behavior of the hydraulic fracturing fluid may be determined by measuring the shear stress on the hydraulic fracturing fluid at different shear rates, which may be accomplished by measuring the shear stress and shear rate on the hydraulic fracturing fluid. The various shear rates are utilized, as hydraulic fracturing fluid behaves as a rigid body at lesser stress but flows as a viscous fluid at greater shear stress. The rheology of the hydraulic fracturing fluid may be characterized by the plastic viscosity (PV) in centiPoises (cP) and the yield point (YP), which are parameters from the Bingham plastic rheology model. The PV is related to the resistance of the hydraulic fracturing fluid to flow due to mechanical interaction between the solids of the hydraulic fracturing fluid and represents the viscosity of the hydraulic fracturing fluid extrapolated to infinite shear rate. The PV reflects the type and concentration of the solids in the hydraulic fracturing fluid. The PV of a hydraulic fracturing fluid may be estimated by measuring the shear stress of the hydraulic fracturing fluid using the previously described rheometer at spindle speeds of 300 rotations per minute (RPM) and 600 RPM and subtracting the 300 RPM dial reading from the 600 RPM dial reading according to Equation 1:

$$PV\ (cP) = (\text{dial reading at 600 RPM}) - (\text{dial reading at 300 RPM}) \quad \text{Equation 1}$$

According to some embodiments, the PV of the magnetically responsive drilling fluid in a $\beta$ Tesla magnetic field is at least 10% greater than the PV of the magnetically responsive drilling fluid in a magnetic field of less than 0.0000001 Tesla. For example the PV may increase by at least 10%, 15%, 20%, 25%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000%, 1500%, 2000%, 2500%, 3000%, 3500%, 4000%, 4500%, 5000%, or 10,000%. $\beta$ may be from 0.001 to 0.005 T, 0.005 to 0.01 T, 0.01 to 0.02 T, 0.02 to 0.03 T, 0.03 to 0.04 T, 0.04 to 0.05 T, 0.05 to 0.075 T, 0.075 to 0.1 T, 0.1 to 0.15 T, 0.15 to 0.2 T, 0.2 to 0.3 T, 0.3 to 0.4 T, 0.4 to 0.5 T, 0.5 to 0.6 T, 0.6 to 0.7 T, 0.7 to 0.8 T, 0.8 to 0.9 T, 0.9 to 1.0 T, 1.0 to 1.5 T, 1.5 to 2.0 T, 2.0 to 2.5 T, 2.5 to 3.0 T, 3.0 to 3.5 T, 3.5 to 4.0 T, 4.0 to 4.5 T, 4.5 to 5.0 T, 5.0 to 5.5 T, 5.5 to 6.0 T, 6.0 to 7.0 T, 7.0 to 8.0 T, 8.0 to 9.0 T, 9.0 to 10.0 T, or any combination of these. In some embodiments, $\beta$ may be greater than 10 T.

According to some embodiments, a Newtonian viscosity ($\mu$) of the magnetically responsive drilling fluid in a $\beta$ Tesla magnetic field is at least 10% greater than the Newtonian viscosity ($\mu$) of the magnetically responsive drilling fluid in a magnetic field of less than 0.0000001 Tesla. For example the Newtonian viscosity ($\mu$) may increase by at least 10%, 15%, 20%, 25%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000%, 1500%, 2000%, 2500%, 3000%, 3500%, 4000%, 4500%, 5000%, or 10,000%. $\beta$ may be from 0.001 to 0.005 T, 0.005 to 0.01 T, 0.01 to 0.02 T, 0.02 to 0.03 T, 0.03 to 0.04 T, 0.04 to 0.05 T, 0.05 to 0.075 T, 0.075 to 0.1 T, 0.1 to 0.15 T, 0.15 to 0.2 T, 0.2 to 0.3 T, 0.3 to 0.4 T, 0.4 to 0.5 T, 0.5 to 0.6 T, 0.6 to 0.7 T, 0.7 to 0.8 T, 0.8 to 0.9 T, 0.9 to 1.0 T, 1.0 to 1.5 T, 1.5 to 2.0 T, 2.0 to 2.5 T, 2.5 to 3.0 T, 3.0 to 3.5 T, 3.5 to 4.0 T, 4.0 to 4.5 T, 4.5 to 5.0 T, 5.0 to 5.5 T, 5.5 to 6.0 T, 6.0 to 7.0 T, 7.0 to 8.0 T, 8.0 to 9.0 T, 9.0 to 10.0 T, or any combination of these. In some embodiments, $\beta$ may be greater than 10 T. Newtonian viscosity ($\mu$), as used in this disclosure, is measured in units of Newton-Seconds/Meters-squared (N–S/m$^2$). The viscosity comparison is conducted on the same fluid under the same conditions when the magnetic field is applied vs when it is not applied, such as the same temperature, pressure, shear rate, shear force, etc.

The YP represents the shear stress less than which the magnetically responsive drilling fluid behaves as a rigid body and greater than which the magnetically responsive drilling fluid flows as a viscous fluid. In other words, the YP represents the amount of stress required to move the magnetically responsive drilling fluid from a static condition. The YP is expressed as a force per area, such as pounds of force per one hundred square feet (lb$_f$/100 ft$^2$) for example. YP provides an indication of the rock cuttings carrying capacity of the magnetically responsive drilling fluid through the annulus, which in simplified terms gives an indication of the magnetically responsive drilling fluid's hole-cleaning ability. A magnetically responsive drilling fluid having a YP of equal to or greater than 15 lb$_f$/100 ft$^2$ is considered acceptable for drilling. The YP is determined by extrapolating the Bingham plastic rheology model to a shear rate of zero. The YP may be estimated from the PV (as measured in accordance with Equation 2, as previously described) according to Equation 1:

$$YP = (300\ \text{RPM reading}) - PV \quad \text{Equation 2}$$

According to some embodiments, a YP of the magnetically responsive drilling fluid in a $\beta$ Tesla magnetic field is at least 10% greater than the YP of the magnetically responsive drilling fluid in a magnetic field of less than 0.0000001 Tesla. For example the YP may increase by at least 10%, 15%, 20%, 25%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000%, 1500%, 2000%, 2500%, 3000%, 3500%, 4000%, 4500%, 5000%, or 10,000%. $\beta$ may be from 0.001 to 0.005 T, 0.005 to 0.01 T, 0.01 to 0.02 T, 0.02 to 0.03 T, 0.03 to 0.04 T, 0.04 to 0.05 T, 0.05 to 0.075 T, 0.075 to 0.1 T, 0.1 to 0.15 T, 0.15 to 0.2 T, 0.2 to 0.3 T, 0.3 to 0.4 T, 0.4 to 0.5 T, 0.5 to 0.6 T, 0.6 to 0.7 T, 0.7 to 0.8 T, 0.8 to 0.9 T, 0.9 to 1.0 T, 1.0 to 1.5 T, 1.5 to 2.0 T, 2.0 to 2.5 T, 2.5 to 3.0 T, 3.0 to 3.5 T, 3.5 to 4.0 T, 4.0 to 4.5 T, 4.5 to 5.0 T, 5.0 to 5.5 T, 5.5 to 6.0 T, 6.0 to 7.0 T, 7.0 to 8.0 T, 8.0 to 9.0 T, 9.0 to 10.0 T, or any combination of these. In some embodiments, $\beta$ may be greater than 10 T.

Other important characteristics may also change with the application of the magnetic field, such as, permittivity or conductivity. These permittivity and conductivity characteristics may be changed by the ability of ions and molecules to move within the fluid.

According to some embodiments, the permittivity (F/m) of the magnetically responsive drilling fluid in a $\beta$ Tesla magnetic field is at least 10% greater than the permittivity of the magnetically responsive drilling fluid in a magnetic field of less than 0.0000001 Tesla. For example the permittivity may increase by at least 10%, 15%, 20%, 25%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000%, 1500%, 2000%, 2500%, 3000%, 3500%, 4000%, 4500%, 5000%, or 10,000%. $\beta$ may be from 0.001 to 0.005 T, 0.005 to 0.01 T, 0.01 to 0.02 T, 0.02 to 0.03 T, 0.03 to 0.04 T, 0.04 to 0.05 T, 0.05 to 0.075 T, 0.075 to 0.1 T, 0.1 to 0.15 T, 0.15 to 0.2 T, 0.2 to 0.3 T, 0.3 to 0.4 T, 0.4 to 0.5 T, 0.5 to 0.6 T, 0.6 to 0.7 T, 0.7 to 0.8 T, 0.8 to 0.9 T, 0.9 to 1.0 T, 1.0 to 1.5 T, 1.5 to 2.0 T, 2.0 to 2.5 T, 2.5 to 3.0 T, 3.0 to 3.5 T, 3.5 to 4.0 T, 4.0 to 4.5 T, 4.5 to 5.0 T, 5.0 to 5.5 T, 5.5 to 6.0 T, 6.0 to 7.0 T, 7.0 to 8.0 T, 8.0 to 9.0 T, 9.0 to 10.0 T, or any combination of these. In some embodiments, $\beta$ may be greater than 10 T. Permittivity is measured in units of farads per meter (F/m) and describes the amount of charge needed to generate a flux in a medium.

According to some embodiments, the conductivity of the magnetically responsive drilling fluid in a β Tesla magnetic field is at least 10% greater than the conductivity of the magnetically responsive drilling fluid in a magnetic field of less than 0.0000001 Tesla. For example the conductivity may increase by at least 10%, 15%, 20%, 25%, 30%, 40%, 50%, 60%, 70%, 80%, 90%, 100%, 125%, 150%, 175%, 200%, 250%, 300%, 350%, 400%, 450%, 500%, 600%, 700%, 800%, 900%, 1000%, 1500%, 2000%, 2500%, 3000%, 3500%, 4000%, 4500%, 5000%, or 10,000%. β may be from 0.001 to 0.005 T, 0.005 to 0.01 T, 0.01 to 0.02 T, 0.02 to 0.03 T, 0.03 to 0.04 T, 0.04 to 0.05 T, 0.05 to 0.075 T, 0.075 to 0.1 T, 0.1 to 0.15 T, 0.15 to 0.2 T, 0.2 to 0.3 T, 0.3 to 0.4 T, 0.4 to 0.5 T, 0.5 to 0.6 T, 0.6 to 0.7 T, 0.7 to 0.8 T, 0.8 to 0.9 T, 0.9 to 1.0 T, 1.0 to 1.5 T, 1.5 to 2.0 T, 2.0 to 2.5 T, 2.5 to 3.0 T, 3.0 to 3.5 T, 3.5 to 4.0 T, 4.0 to 4.5 T, 4.5 to 5.0 T, 5.0 to 5.5 T, 5.5 to 6.0 T, 6.0 to 7.0 T, 7.0 to 8.0 T, 8.0 to 9.0 T, 9.0 to 10.0 T, or any combination of these. In some embodiments, β may be than 10 T. As it relates to this disclosure, conductivity is measured in Siemens/meter (S/m).

According to some embodiments, the superparamagnetic nanostructure 100 may include CNTs 120 and the CNT's may be deposited on the SPIONs 110 by chemical vapor deposition. The weight ratio of carbon nanotubes 120 to SPIONs 110 may be from 1000:1 to 750:1, 750:1 to 500:1, 500:1 to 250:1, 250:1 to 200:1, 200:1 to 150:1, 150:1 to 100:1, 75:1, 75:1 to 50:1, 50:1 to 40:1, 40:1 to 30:1, 30:1 to 20:1, 20:1 to 10:1, 10:1 to 9:1, 9:1 to 8:1, 8:1 to 7:1, 7:1 to 6:1, 6:1 to 5:1, 5:1 to 4:1, 4:1 to 3:1, 3:1 to 2:1, 2:1 to 1:1, 1:1 to 1:2, 1:2 to 1:3, 1:3 to 1:4, 1:4 to 1:5, 1:5 to 1:6, 1:6 to 1:7, 1:7 to 1:8, 1:8 to 1:9, 1:9 to 1:10, 1:10 to 1:20, 1:20 to 1:30, 1:30 to 1:40, 1:40 to 1:50, 1:50 to 1:75, 1:75 to 1:100, 1:100 to 1:150, 1:150 to 1:200, 1:200 to 1:250, 1:250 to 1:500, 1:500 to 1:750, 1:750 to 1:1000, or any combination of these.

The carbon nanotubes 120 may include at least one of single-walled nanotubes, double-walled nanotubes, multi-walled nanotubes, narrow-walled nanotubes, or bundle of nanotubes. The carbon nanotubes 120 may include a diameter of from 1 to 200 nm, from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or any combination of these.

The carbon nanotubes 120 may include a length of from 20 to 500 microns (μm), 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm; an aspect ratio of from 100 to 50,000, from 500 to 30,000, from 1,000 to 200,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, from 50,000 to 100,000, or any combination of these.

The carbon nanotubes 120 may include a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory.

The multi-walled carbon nanotubes 120 may include a metal oxide percentage of 10 weight percent (wt. %) or less, 5 wt. % or less, 3 wt. % or less, 2 wt. % or less, 1.5 wt. % or less, 1 wt. % or less, or 0.5 wt. % or less; and a bulk density of from 0.001 to 0.12 $g/cm^3$, from 0.01 to 0.08 $g/cm^3$, from 0.02 to 0.06 $g/cm^3$, from 0.01 to 1 grams per cubic centimeter ($g/cm^3$), from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 $g/cm^3$, from 0.02 to 0.1 $g/cm^3$, from 0.02 to 0.05 $g/cm^3$, from 0.05 to 1 $g/cm^3$, from 0.05 to 0.5 $g/cm^3$, from 0.05 to 0.2 $g/cm^3$, from 0.05 to 0.1 $g/cm^3$, from 0.06 to 0.08 $g/cm^3$, from 0.1 to 1 $g/cm^3$, 0.1 to 0.5 $g/cm^3$, from 0.1 to 0.2 $g/cm^3$, from 0.2 to 1 $g/cm^3$, from 0.2 to 0.5 $g/cm^3$, or from 0.5 to 1 $g/cm^3$.

According to some embodiments, the nanostructures may include silicon carbide nanotubes. Synthesizing silicon carbide nanotubes may further include heating the carbon nanotubes 120 to from 300° C. to 1600° C., from 300° C. to 1400° C., from 300° C. to 1200° C., from 300° C. to 1000° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1000° C., from 600° C. to 1200° C., from 600° C. to 1400° C., from 600° C. to 1600° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, heating the carbon nanotubes 120 may include placing the carbon nanotubes 120 into an oven or a reactor. In some embodiments, the reactor may be evacuated to an absolute pressure of from $1\times10^{-100}$ Torr to $1\times10^{-50}$ Torr, $1\times10^{-50}$ Torr to $1\times10^{-25}$ Torr, $1\times10^{-25}$ Torr to $1\times10^{-10}$ Torr, $1\times10^{-10}$ Torr to $1\times10^{-5}$ Torr, $1\times10^{-5}$ Torr to $1\times10^{-1}$ Torr, $1\times10^{-1}$ Torr to 0.5 Torr, 0.5 Torr to 1 Torr, 1 Torr to 10 Torr, 10 Torr to 20 Torr, 20 Torr to 40, 40 Torr to 50 Torr, 50 Torr to 100 Torr, 100 Torr to 150 Torr, 150 Torr to 300 Torr, 300 Torr to 450 Torr, 450 Torr to 600 Torr, 600 Torr to 750 Torr, or any combination of these.

In some embodiments, synthesizing the silicon carbide nanotubes may include placing silicon precursors in the oven, which vaporize as the oven heats, to form the quantity of SiCNTs. In other embodiments, synthesizing the silicon carbide nanotubes may include flowing a gas mixture over the carbon nanotubes 120 to form the quantity of SiCNTs. In some embodiments, the gas mixture may include argon, hydrogen, silicon, methyltrichlorosilane, any other gas containing silicon, and combinations of these. Specifically, in one embodiment, the gas mixture may include argon, hydrogen, and methyltrichlorosilane.

In some embodiments, heating the carbon nanotubes 120 includes flowing a gas mixture over the carbon nanotubes 120 with a heating rate of from 1 degree Celsius per minute (° C./min.) to 20° C./min., from 3° C./min. to 10° C./min., from 5° C./min. to 10° C./min., from 5° C./min. to 7° C./min., or of 5° C./min. until the carbon nanotubes 120 are heated to ranges disclosed previously, and adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % silicon-based gas, as calculated by a volume of the gas mixture, to the gas mixture, and flowing the gas mixture over the carbon nanotubes 120 to form SiCNTs. The silicon-based gas may include any gas that includes silicon, such as methyltrichlorosilane, N-sec-butyl(trimethylsilyl)amine, chloropentamethyldisilane, hexamethyldisilane, pentamethyldisilane, silicon tetrabromide, triethylsilane, or any other silicon containing gas, or mixtures of these. The gas mixture including argon, hydrogen, and silicon may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 10 to 1000 milliliter per minute (ml/min.), from 50 to 800 ml/min., from 100 to 400 ml/min., or at 150 ml/min. According to some embodiments, the gas mixture may be prepared by flowing hydrogen gas through methyltricholorosilane, thereby generating the silicon-based gas.

The SiCNTs may be annealed in air at an elevated temperature. As used in this disclosure, annealing refers to the process of heating a substrate under a specific atmosphere, to an annealing temperature, holding the substrate at the annealing temperature for a period of time, and allowing the substrate to cool. An annealing temperature is a temperature less than the melting temperature of the substrate. For example, the SiCNTs may be annealed at a temperature from 500° C. to 600° C., from 600° C. to 700° C., from 700° C. to 800° C., from 800° C. to 900° C., from 900° C. to 1000° C., from 1000° C. to 1100° C., from 1100° C. to 1200° C., from 1200° C. to 1300° C., from 1300° C. to 1400° C., from 1400° C. to 1500° C., from 1500° C. to 1600° C., from 1600° C. to 1700° C., from 1700° C. to 1800° C., or any combination of these. For example, the SiCNTs may be held at the annealing temperature for from 0.001 min. to 5 min., from 5 min. to 10 min., from 10 min. to 20 min., from 20 min. to 30 min., from 30 min. to 40 min., from 40 min. to 50 min., from 50 min. to 60 min., from 60 min. to 70 min., or greater than 70 min., or any combination of these. The annealing step may further include a cooling step in which the temperature of the SiCNTs may be reduced by from 200° C./min. to 150° C./min., from 150° C./min. to 100° C./min., from 100° C./min. to 50° C./min., from 50° C./min. to 25° C./min., from 25° C./min. to 20° C./min., from 20° C./min. to 15° C./min., from 15° C./min. to 10° C./min., from 10° C./min. to 5° C./min., from 5° C./min. to 1° C./min., from 1° C./min. to 0.5° C./min., from 0.5° C./min. to 0.1° C./min., or even less than 0.1° C./min., or any combination of these. The annealing step may occur under a specific atmosphere where the specific atmosphere includes air, inert gas, a reducing gas, an oxidizing gas, or a combination of these.

According to some embodiments, the magnetically responsive drilling fluid may include an aqueous phase. As stated, the aqueous phase may be any suitable fluid containing, producing, resembling, or having the properties of water. The aqueous phase in some embodiments may contain water, including freshwater, seawater, produced water, or formation water. The aqueous phase may contain brine, including natural and synthetic brine, such as saturated brine or formate brine. The aqueous phase in some embodiments may use water containing organic compounds or salt. Without being bound by any particular theory, salt or other organic compounds may be incorporated into the aqueous phase to control the density of the emulsified magnetically responsive drilling fluid. Increasing the saturation of the aqueous phase by increasing the salt concentration or the level of other organic compounds in the aqueous phase may increase the density of the magnetically responsive drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase. Without being bound by any particular theory, brine may be used to create osmotic balance between the magnetically responsive drilling fluid and the subsurface formation.

In some embodiments, the magnetically responsive drilling fluid may include from 0 weight percent (wt. %) to 100 wt. % of the aqueous phase based on the total weight of the magnetically responsive drilling fluid. In some embodiments, the magnetically responsive drilling fluid may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous phase.

The magnetically responsive drilling fluid of the present embodiments may also include an oleaginous phase. As stated, the oleaginous phase refers to a fluid containing, producing, resembling, or having the properties of oil. The oleaginous phase may be oil, such as natural or synthetic liquid oil. The oleaginous phase may be or may contain diesel oil, mineral oil, hydrogenated or unhydrogenated olefins such as poly-alpha olefins, linear and branched olefins, poly-diorganosiloxanes, silxoanes, organosiloxanes, esters of fatty acids, straight chain, branched or cyclical alkyl ethers of fatty acids, or combinations of any of these. The oleaginous phase may contain esters, ethers, acetals, dialkylcarbonates, hydrocarbons or combinations of any of these. In some embodiments, the oleaginous phase may contain or may be oils derived from petroleum, such as mineral oils, diesel oils, linear olefins, paraffin, other petroleum-based oils, and combinations of these oils or oils derived from plants, such as safra oil, for example.

The magnetically responsive drilling fluid may include from 0 wt. % to 100 wt. % of the oleaginous phase based on the total weight of the magnetically responsive drilling fluid. The magnetically responsive drilling fluid may contain from 28 lb/bbl to 810 lb/bbl of the oleaginous phase based on the total weight of the magnetically responsive drilling fluid, such as from 30 to 800 lb/bbl, from 50 to 800 lb/bbl, from 75 to 800 lb/bbl, or from 100 to 800 lb/bbl. In some embodiments, the magnetically responsive drilling fluid may contain from 200 to 800 lb/bbl, or 300 to 600 lb/bbl, or 500 to 810 lb/bbl of the oleaginous phase.

The magnetically responsive drilling fluid may include one or more additives selected from the group consisting of weighting agents, fluid loss control agents, lost circulation control agents, surfactants, antifoaming agents, viscosifiers, and combinations of these. The magnetically responsive drilling fluid may include from 0.01 wt. % to 20 wt. % of the surfactant based on the total weight of the magnetically responsive drilling fluid. The magnetically responsive drilling fluid may contain from 0.02 lb/bbl to 180 lb/bbl of the surfactant based on the total weight of the magnetically responsive drilling fluid, such as from 0.02 to 150 lb/bbl, or from 0.05 to 150 lb/bbl. In some embodiments, the magnetically responsive drilling fluid may contain from 0.1 to 150 lb/bbl, or from 0.1 to 100 lb/bbl, or from 1 to 100 lb/bbl of the surfactant.

In some embodiments, the magnetically responsive drilling fluid may contain at least one additive other than the surfactant. The one or more additives may be any additives known to be suitable for drilling fluids. As non-limiting examples, suitable additives may include weighting agents, fluid loss control agents, lost circulation control agents, filtration control additives, surfactants, antifoaming agents, supplemental emulsifiers, weighting agent, fluid loss additives, an alkali reserve, and combinations of these.

In some embodiments, the one or more additives may include an additional viscosifier, also referred to as a rheology modifier, which may be added to the magnetically responsive drilling fluid to impart non-Newtonian fluid rheology to the magnetically responsive drilling fluid to facilitate lifting and conveying rock cuttings to the surface of the wellbore. Examples of viscosifiers may include, but are not limited to bentonite, polyacrylamide, polyanionic cellulose, or combinations of these viscosifiers. In some embodiments, the magnetically responsive drilling fluid may include xanthan gum, a polysaccharide commonly referred to as XC polymer. The XC polymer may be added to the water-based drilling fluid to produce a flat velocity profile of the water-based drilling fluid in annular flow, which may help to improve the efficiency of the magnetically responsive drilling fluid in lifting and conveying rock cuttings to the surface.

In some embodiments, the magnetically responsive drilling fluid may include from 0.01 wt. % to 20 wt. % of the one or more additives based on the total weight of the magnetically responsive drilling fluid. The magnetically responsive drilling fluid may contain from 0.02 lb/bbl to 180 lb/bbl of the one or more additives based on the total weight of the magnetically responsive drilling fluid, such as from 0.02 to 150 lb/bbl, or from 0.05 to 150 lb/bbl. In some embodiments, the magnetically responsive drilling fluid may contain from 0.1 to 150 lb/bbl, or from 0.1 to 100 lb/bbl, or from 1 to 100 lb/bbl of the one or more additives.

In some embodiments, the one or more additives may include solids, sometimes referred to as weighting material, which may be dispersed in the magnetically responsive drilling fluid. The solids may be finely divided solids having a specific gravity (SG) greater than 1 that may be added to the magnetically responsive drilling fluid to increase the density of the magnetically responsive drilling fluid. Examples of weighting materials suitable for use as the solids include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), or any combination of these weighting materials. In some embodiments, the magnetically responsive drilling fluid may include barite as the solid.

In embodiments, the magnetically responsive drilling fluid may have a solids content of from 1 wt. % to 80 wt. % based on the weight of the solid weighing material based on the total weight of the magnetically responsive drilling fluid. The magnetically responsive drilling fluid may have a solids content of from 2.5 lb/bbl to 720 lb/bbl, such as from 2.5 to 720 lb/bbl, or 2.5 to 700 lb/bbl. In some embodiments, the magnetically responsive drilling fluid may have a solids content of from 5 to 700 lb/bbl, from 50 to 500 lb/bbl, or from 100 to 600 lb/bbl.

Alternatively, in some embodiments, solids may not be needed to stabilize the magnetically responsive drilling fluid. Thus, in some embodiments, the magnetically responsive drilling fluid may not contain solids, or may not contain more than 2 lbs/bbl, such as less than 1 lb/bbl of solids.

As stated, the addition of solids may be used to control the density of the magnetically responsive drilling fluid. In some embodiments, the magnetically responsive drilling fluid may have a density of from 50 pounds of mass per cubic foot (pcf) to 160 pcf, as measured using a mud balance in accordance with the American Petroleum Institute (API) recommended practice 13B-2, 2009. The magnetically responsive drilling fluid may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the magnetically responsive drilling fluid may have a density of from 50 pcf to 75 pcf, or from 75 pcf to 100 pcf, or from 120 pcf to 160 pcf. In some embodiments, lesser mud weights may be used when drilling depleted formations.

Embodiments of the disclosure further relate to methods of producing a magnetically responsive drilling fluid. The produced magnetically responsive drilling fluids may be in accordance with any of the embodiments previously described. The method may involve mixing a drilling fluid with a plurality of superparamagnetic nanostructures 100. The magnetically responsive drilling fluid and the superparamagnetic nanostructures 100 may be in accordance with any of the embodiments previously described.

In one embodiment, synthesizing carbon nanotubes via chemical vapor deposition on metal oxides to form particles may include mixing an aqueous solution including an aqueous suspension of the SPIONs 110 to form a mixture. In some embodiments, the aqueous suspension may include from 5 to 50 wt. %, from 5 to 30 wt. %, from 5 to 25 wt. %, from 5 to 20 wt. %, from 5 to 15 wt. %, from 5 to 10 wt. %, from 10 to 50 wt. %, from 10 to 30 wt. %, from 10 to 25 wt. %, from 10 to 20 wt. %, from 10 to 15 wt. %, from 15 to 50 wt. %, from 15 to 30 wt. %, from 15 to 25 wt. %, from 15 to 20 wt. %, from 20 to 50 wt. %, from 20 to 30 wt. %, from 20 to 25 wt. %, from 25 to 50 wt. %, from 25 to 30 wt. %, from 30 to 50 wt. % SPIONs 110 as calculated by a weight of the aqueous suspension. Synthesizing the carbon nanotubes may then include stirring the mixture, drying the mixture at room temperature, and then grinding the mixture into a powder to form metal oxides.

In an alternate embodiment, synthesizing carbon nanotubes via chemical vapor deposition on the SPIONs 110 may include mixing an aqueous solution including a transition metal to form a mixture. Synthesizing the carbon nanotubes may then include stirring the mixture and calcining the mixture at from 100° C. to 500° C., from 200° C. to 500° C., from 300° C. to 500° C., from 200° C. to 400° C., or from 300° C. to 400° C. for from 5 to 15 hours, from 5 to 12 hours, from 5 to 10 hours, from 5 to 8 hours, from 8 to 15 hours, from 8 to 12 hours, from 8 to 10 hours, from 10 to 15 hours, from 10 to 12 hours, or from 12 to 15 hours. Synthesizing the carbon nanotubes may then include grinding the mixture into a powder to form metal oxides.

Synthesizing the carbon nanotubes may further include heating the metal oxides to from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments this may include placing the metal oxides into an oven or a reactor. In some embodiments, synthesizing the carbon nanotubes may include placing carbon precursors in the oven, which vaporize as the oven heats, to form particles including carbon nanotubes and metal oxides. In other embodiments, synthesizing the carbon nanotubes may include flowing a gas mixture over the metal oxides to form particles including carbon nanotubes and metal oxides. In some embodiments, the gas mixture may include argon, hydrogen, ethylene, any other gas containing carbon, and combinations of these. Specifically, in one embodiment, the gas mixture may include argon, hydrogen, and ethylene.

In some embodiments, heating the metal oxides includes flowing a gas mixture over the metal oxides with a heating rate of from 1° C. per minute (° C./min.) to 20° C./min., from 3° C./min. to 10° C./min., from 5° C./min. to 10° C./min., from 5° C./min. to 7° C./min., or of 5° C./min. until the metal oxides are heated to ranges disclosed previously, and adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % carbon-based gas, as calculated by a volume of the gas mixture, to the gas mixture, and flowing the gas mixture over the metal oxides to form particles including carbon nanotubes and metal oxides. The carbon-based gas may include any gas that includes carbon, such as, as nonlimiting examples, carbon dioxide or hydrocarbon gases. In some embodiments, the carbon-based gas may be ethylene. The gas mixture including argon, hydrogen, and ethylene may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 400 to 1000 milliliter per minute (ml/min.), from 500 to 800 ml/min., from 600 to 800 ml/min., or at 700 ml/min.

In some embodiments, the magnetically responsive drilling fluid may be mixed at a shear speed of from 40 rotations per minute (RPM) to 16000 RPM. The mixture may be mixed at a shear speed of from 40 RPM to 80 RPM, 80 RPM to 160 RPM, 160 RPM to 300 RPM, 300 RPM to 400 RPM, 400 RPM to 500 RPM, 500 RPM to 750 RPM, 750 RPM to 1000 RPM, 1000 RPM to 1500 RPM, 1500 RPM to 2000 RPM, 2000 RPM to 4000 RPM 4000 RPM to 50000 RPM, 5000 RPM to 15000 RPM, or from 5000 RPM to 1000 RPM, or from 8000 RPM to 16000 RPM, or from 10000 RPM to 16000 RPM, or from 12000 RPM to 16000 RPM. Without being bound by any particular theory, shearing the mixture may disperse the superparamagnetic nanostructures 100 in the drilling fluid.

Embodiments of the disclosure may also relate to methods for using the magnetically responsive drilling fluid. The magnetically responsive drilling fluid may be in accordance with any of the embodiments previously described. In some embodiments, the method may include introducing a magnetically responsive drilling fluid including a drilling fluid and a plurality of superparamagnetic nanostructures disposed within the drilling fluid into a subsurface formation. Introducing may involve injecting the magnetically responsive drilling fluid into the subsurface formation, which in some embodiments, may be a well. The magnetically responsive drilling fluid may be circulated within the subsurface formation. In some embodiments, a mud pump may be used to inject the magnetically responsive drilling fluid into the subsurface formation. The method may further include applying a magnetic field to the magnetically responsive drilling fluid to elicit a rheological change in the magnetically responsive drilling fluid.

In some specific embodiments the disclosure relates to methods of using the magnetically responsive drilling fluid for oil and gas drilling. The methods may include pumping the magnetically responsive drilling fluid through a drill string to a drill bit and recirculating the magnetically responsive drilling fluid. Recirculating the fluid may allow the magnetically responsive drilling fluid to cool and lubricate the drill bit and to lift rock cuttings away from the drill bit, carrying the cuttings upwards to the surface to clean the wellbore. The magnetically responsive drilling fluid may additionally provide hydrostatic pressure to support the sidewalls of the wellbore and prevent the sidewalls from collapsing onto the drill string. In some embodiments, a magnetic field may be applied to elicit a rheology change in the magnetically responsive drilling fluid.

Applying the magnetic field may include using a magnetic field generator. The magnetic field generator may be inserted along the drill string, a device placed semi permanently in the drill hole, a device placed permanently in the drill hole, or a combination of these. The magnetic field generator may include for example, an electromagnet, a superconducting electromagnet, a dipole ring magnetic field generator, a Helmholtz coil, or a combination of coil windings and a permanent magnet. In the case of the combination of coil windings and the permanent magnet, either the permanent magnet or the coil windings may rotate while the other stays still. Energy may be supplied to the electromagnetic field generator in the form of electrical energy, rotational energy from the drill string, or both. It may be advantageous to use a combination of rotational and electrical energy for improved control over the strength of the magnetic field.

The magnetic field generator may be placed anywhere along the drill string. For example, the magnetic field generator may be placed near the drill head, 1% to 2%, 2% to 3%, 3% to 4%, 4% to 5%, 5% to 6%, 6% to 7%, 7% to 8%, 8% to 9%, 9% to 10%, 10% to 15%, 15% to 20%, 20% to 25%, of the way up the drill string. For example the magnetic field generator may be placed a distance of 1 to 2 feet (ft), 2 to 3 ft, 3 to 4 ft, 4 to 5 ft, 5 10 ft, 10 to 15 ft, 15 to 20 ft, 20 to 25 ft, 25 to 30 ft, 30 to 40 ft, 40 to 50 ft, 50 to 75 ft, 75 to 100 ft, 100 to 200 ft, 200 to 300 ft, 300 to 400 ft, 400 to 500 ft, 500 to 750 ft, 750 to 1000 ft, 1000 to 1500 ft, 1500 to 2000 ft, or any combination of these, from the drill head. Multiple magnetic field generators may be employed to control the magnetic field at multiple points along the drill string.

The methods of using the magnetically responsive drilling fluid may further include using one or more sensors to determine the rheological properties of the magnetically responsive drilling fluid at one or more positions downhole. The sensors may be configured to determine viscosity, leakage of drilling fluid, leakage of petroleum products, presence of gas in the magnetically responsive drilling fluid, temperature of the magnetically responsive drilling fluid, shear rate, drilling fluid sag, or any other data which may be useful when determining the desired viscosity of the magnetically responsive drilling fluid. The data provided by these sensors may enable a feedback loop to select and optimize the magnetic field strength downhole.

According to some embodiments, applying the magnetic field may increase a Newtonian viscosity, a plastic viscosity, a yield point, or combinations of these of the magnetically responsive drilling fluid by at least 10%.

According to some embodiments, the applied magnetic field is at least 0.001 Tesla. For example, the magnetic field may be at least 0.001, 0.01, 0.05, 0.1, 0.2, 0.3, 0.4, 0.5, 0.6, 0.7, 0.8, 0.9, 1.0, 1.2, 1.4, 1.6, 1.8, 2, 2.5, 3, 3.5, 4, 4.5, 5, 5.5, 6, 6.5, 7, 7.5, 8, 8.5, 9, 9.5, or even greater than 10 Tesla.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

The presently described subject matter may include one or more aspects, which should not be regarded as limiting on the teaching of the present disclosure. A first aspect may include a magnetically responsive drilling fluid comprising a drilling fluid, and a plurality of superparamagnetic nanostructures, in which: the plurality of superparamagnetic nanostructures are disposed within the drilling fluid; and the plurality of superparamagnetic nanostructures comprise superparamagnetic-iron-oxide-nanoparticles (SPIONs) and carbon nanotubes (CNTs) adsorbed onto the SPIONs.

A second aspect may include a method of using a magnetically responsive drilling fluid comprising: introducing the magnetically responsive drilling fluid comprising a drilling fluid and a plurality of superparamagnetic nanostructures disposed within the drilling fluid into a subsurface formation, and applying a magnetic field to the magnetically responsive drilling fluid to elicit a rheological change in the magnetically responsive drilling fluid.

Another aspect may include any of the previous aspects, in which the SPIONs comprise iron oxide particles of between 1 and 1000 nanometers (nm) in average diameter.

Another aspect may include any of the previous aspects, in which individual superparamagnetic nanostructures have an average outer diameter of between 10 nm and 150,000 nm.

Another aspect may include any of the previous aspects, in which the superparamagnetic nanostructures further comprise silicon carbide nanotubes (SiCNT).

Another aspect may include any of the previous aspects, in which the superparamagnetic nanostructures further comprise SiCNT and a mass ratio of silicon to iron is from 1:1 to 1:60,000.

Another aspect may include any of the previous aspects, in which a Newtonian viscosity (μ) of the magnetically responsive drilling fluid in a 0.001 Tesla magnetic field is at least 10% greater than the μ of the magnetically responsive drilling fluid in a magnetic field of less than 0.0000001 Tesla.

Another aspect may include any of the previous aspects, in which a plastic viscosity (PV) of the magnetically responsive drilling fluid in a 0.001 Tesla magnetic field is at least 10% greater than the PV of the magnetically responsive drilling fluid in a magnetic field of less than 0.0000001 Tesla.

Another aspect may include any of the previous aspects, in which a permittivity of the magnetically responsive drilling fluid in a 0.001 Tesla magnetic field is at least 10% less than the permittivity of the magnetically responsive drilling fluid in a magnetic field of less than 0.0000001 Tesla.

Another aspect may include any of the previous aspects, in which a conductivity of the magnetically responsive drilling fluid in a 0.001 Tesla magnetic field is at least 10% less than the conductivity of the magnetically responsive drilling fluid in a magnetic field of less than 0.0000001 Tesla.

Another aspect may include any of the previous aspects, in which a yield point (YP) of the magnetically responsive drilling fluid in a 0.001 Tesla magnetic field is at least 10% greater than the YP of the magnetically responsive drilling fluid in a magnetic field of less than 0.0000001 Tesla.

Another aspect may include any of the previous aspects, in which the magnetically responsive drilling fluid comprises from 0.001 to 10.0 wt. % superparamagnetic nanostructures as calculated by a total weight of the magnetically responsive drilling fluid.

Another aspect may include any of the previous aspects, in which the magnetically responsive drilling fluid comprises an aqueous phase.

Another aspect may include any of the previous aspects, in which the magnetically responsive drilling fluid comprises an oleaginous phase.

Another aspect may include any of the previous aspects, in which the magnetically responsive drilling fluid comprises one or more additives selected from the group consisting of weighting agents, fluid loss control agents, lost circulation control agents, surfactants, antifoaming agents, viscosifiers, and combinations of these.

Another aspect may include any of the previous aspects, in which the plurality of superparamagnetic nanostructures comprise superparamagnetic-iron-oxide-nanoparticles (SPIONs) and carbon nanotubes adsorbed onto the SPIONs.

Another aspect may include any of the previous aspects, in which the SPIONs comprise iron oxide particles of between 1 and 1000 nanometers (nm) in average diameter.

Another aspect may include any of the previous aspects, in which applying the magnetic field comprises using a magnetic field generator.

Another aspect may include any of the previous aspects, further comprising using one or more sensors to determine the rheological properties of the magnetically responsive drilling fluid at one or more positions downhole.

Another aspect may include any of the previous aspects, in which the applied magnetic field is at least 0.001 Tesla.

Another aspect may include any of the previous aspects, in which applying the magnetic field increases a Newtonian viscosity, a plastic viscosity, a yield point, or combinations of these of the magnetically responsive drilling fluid by at least 10%.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

The invention claimed is:

1. A magnetically responsive drilling fluid comprising:
a drilling fluid, and
a plurality of superparamagnetic nanostructures, in which:
the plurality of superparamagnetic nanostructures is disposed within the drilling fluid; and
the plurality of superparamagnetic nanostructures comprises superparamagnetic-iron-oxide-nanoparticles (SPIONs) and carbon nanotubes (CNTs) adsorbed onto the SPIONs.

2. The magnetically responsive drilling fluid of claim 1, in which the SPIONs comprise iron oxide particles of between 1 and 1000 nanometers (nm) in average diameter.

3. The magnetically responsive drilling fluid of claim 1, in which individual superparamagnetic nanostructures have an average outer diameter of between 10 nm and 150,000 nm.

4. The magnetically responsive drilling fluid of claim 1, in which the superparamagnetic nanostructures further comprise silicon carbide nanotubes (SiCNT).

5. The magnetically responsive drilling fluid of claim 1, in which the superparamagnetic nanostructures further comprise SiCNT and a mass ratio of silicon to iron is from 1:1 to 1:60,000.

6. The magnetically responsive drilling fluid of claim 1, in which a Newtonian viscosity (μ) of the magnetically responsive drilling fluid in a 0.001 Tesla magnetic field is at least 10% greater than the μ of the magnetically responsive drilling fluid in a magnetic field of less than 0.0000001 Tesla.

7. The magnetically responsive drilling fluid of claim 1, in which a plastic viscosity (PV) of the magnetically responsive drilling fluid in a 0.001 Tesla magnetic field is at least 10% greater than the PV of the magnetically responsive drilling fluid in a magnetic field of less than 0.0000001 Tesla.

8. The magnetically responsive drilling fluid of claim 1, in which a permittivity of the magnetically responsive drilling fluid in a 0.001 Tesla magnetic field is at least 10% less than the permittivity of the magnetically responsive drilling fluid in a magnetic field of less than 0.0000001 Tesla.

9. The magnetically responsive drilling fluid of claim 1, in which a conductivity of the magnetically responsive drilling fluid in a 0.001 Tesla magnetic field is at least 10% less than the conductivity of the magnetically responsive drilling fluid in a magnetic field of less than 0.0000001 Tesla.

10. The magnetically responsive drilling fluid of claim 1, in which a yield point (YP) of the magnetically responsive drilling fluid in a 0.001 Tesla magnetic field is at least 10% greater than the YP of the magnetically responsive drilling fluid in a magnetic field of less than 0.0000001 Tesla.

11. The magnetically responsive drilling fluid of claim 1, in which the magnetically responsive drilling fluid comprises from 0.001 to 10.0 wt. % superparamagnetic nanostructures as calculated by a total weight of the magnetically responsive drilling fluid.

12. The magnetically responsive drilling fluid of claim 1, in which the magnetically responsive drilling fluid comprises an aqueous phase.

13. The magnetically responsive drilling fluid of claim 1, in which the magnetically responsive drilling fluid comprises an oleaginous phase.

14. The magnetically responsive drilling fluid of claim 1, in which the magnetically responsive drilling fluid comprises one or more additives selected from the group consisting of weighting agents, fluid loss control agents, lost circulation control agents, surfactants, antifoaming agents, viscosifiers, and combinations of these.

15. A method of using a magnetically responsive drilling fluid comprising:
   introducing the magnetically responsive drilling fluid comprising a drilling fluid and a plurality of superparamagnetic nanostructures disposed within the drilling fluid into a subsurface formation, and
   applying a magnetic field to the magnetically responsive drilling fluid to elicit a rheological change in the magnetically responsive drilling fluid.

16. The method of claim 15, in which the plurality of superparamagnetic nanostructures comprises superparamagnetic-iron-oxide-nanoparticles (SPIONs) and carbon nanotubes adsorbed onto the SPIONs.

17. The method of claim 16, in which the SPIONs comprise iron oxide particles of between 1 and 1000 nanometers (nm) in average diameter.

18. The method of claim 15, in which applying the magnetic field comprises using a magnetic field generator.

19. The method of claim 15, further comprising using one or more sensors to determine the rheological properties of the magnetically responsive drilling fluid at one or more positions downhole.

20. The method of claim 15, in which the applied magnetic field is at least 0.001 Tesla and in which applying the magnetic field increases a Newtonian viscosity, a plastic viscosity, a yield point, or combinations of these of the magnetically responsive drilling fluid by at least 10%.

* * * * *